United States Patent [19]

Welsh

[11] 3,825,775

[45] July 23, 1974

[54] CIRCUIT ARRANGEMENT FOR CONVERTING SQUARE WAVES INTO ASYMMETRICAL RECTANGULAR WAVES

[75] Inventor: Alan B. Welsh, Jasper, Ind.

[73] Assignee: Jasper Electronics Manufacturing Company, Jasper, Ind.

[22] Filed: May 15, 1973

[21] Appl. No.: 360,461

Related U.S. Application Data

[63] Continuation of Ser. No. 136,033, April 21, 1971, abandoned.

[52] U.S. Cl. .................. 307/268, 307/261, 307/288
[51] Int. Cl. .................................... H03k 5/01
[58] Field of Search .................... 307/261, 268, 288

[56] References Cited

UNITED STATES PATENTS

| | | | |
|---|---|---|---|
| 2,842,683 | 7/1958 | Clapper | 307/261 |
| 3,007,060 | 10/1961 | Guenther | 307/268 |
| 3,418,490 | 12/1968 | Hofferber | 307/261 |

*Primary Examiner*—John S. Heyman
*Attorney, Agent, or Firm*—Melvin A. Crosby

[57] ABSTRACT

The specification discloses a generator for producing rectangular waves in which the duty cycle of the waves is adjusted to eliminate unwanted harmonics therefrom. Means can be provided for varying the duty cycle in a desired manner.

9 Claims, 8 Drawing Figures

PATENTED JUL 23 1974 3,825,775

SHEET 1 OF 2

INVENTOR.
ALAN B. WELSH

BY

INVENTOR.
ALAN B. WELSH
BY
Melvin A. Crosby

CIRCUIT ARRANGEMENT FOR CONVERTING SQUARE WAVES INTO ASYMMETRICAL RECTANGULAR WAVES

This is a continuation of application Ser. No. 136,033, filed Apr. 21, 1971 now abandoned.

This invention relates to a method and apparatus for the production of electrical waves, and is particularly concerned with a method and apparatus for the production of rectangular waves, especially asymmetric waves.

The production of electrical waves is important in the electrical transmission of messages and the like and in the production of musical tones. The present invention is particularly described in connection with the adaptation of the present invention to a system for producing electrical tones, but this will be understood to be purely exemplary and that the invention has other uses, as well.

In the production of tones for an electronic organ, for example, the general arrangement is to provide a series of 12 sources, referred to as a tone generator, or master oscillator, related to each other in frequency as the notes of the diatonic scale. The frequencies generated directly at the source are usually higher than the highest tones to be developed and are reduced in frequency through a series of frequency dividers whereby tones corresponding to the various footages can be produced.

There might be produced, for example, notes corresponding to footages of 32, 16, 8, 4, 2, and, on occasion, 1. A convenient manner of dividing the frequency is to employ a series of bistable multivibrators, the output from each of which is, in frequency, exactly one-half the frequency of the output from the next preceding multivibrator. The wave forms from such multivibrators are in the form of symmetrical rectangular waves, namely, square waves, and through suitable voice formant filters, the desired particular voices of the organ can be derived.

A particular defect that is characteristic of a symmetrical rectangular, or square, wave is that such a wave contains only odd harmonics of the fundamental. With only odd harmonics in the wave, any voices simply derived therefrom will have a characteristic, rather thin, "clarinet" quality and which is not desirable for other voices, such as violin voices and the like.

Various filtering and mixing methods have been proposed as, for example, the resistive mixing system disclosed in the U.S. Langer Pat. No. 2,533,821, to add even harmonics to a wave of this nature and thereby modify the quality to permit the production of voices which cannot normally be obtained from a square wave. While the arrangement of this patent does add even harmonics to the wave, it has the disadvantage of developing subtones which detracts from the quality of certain voices derived therefrom, for example, flute voices which should be extremely clear and free of subtones.

Other attempts have been made to shape the wave form to include even harmonics therein, and one of the best known is the use of a saw tooth wave or ramp function. While this wave contains the necessary harmonics to produce substantially any type of voice, the disadvantage exists that the keying of the tones is difficult, especially when percussion effects or controlled decay of a tone is desired. Further, it is difficult to maintain the accuracy of a saw tooth wave form as it goes through the transition region.

A square wave, on the other hand, is quite easy to control as to wave form and is quite easy to key in a simple and efficient manner. Such a keying arrangement as illustrated in the U.S. Pat. No. to Slaats 3,389,211. Such a keying system can be employed with a wave form and decay percussion does not in any way change the character of the tone.

The present invention is concerned with the provision of a relatively simple apparatus, and a method of, modifying the shape of a basic square to control the harmonic content thereof, thereby to produce certain desired musical effects.

The present invention is, furthermore, concerned with varying the change of the wave form in a controlled manner, thereby to produce a celeste or a changing slow beat tone quality.

The invention is still further concerned with the provision of such an apparatus in which an extremely live vibrato effect can be produced that is of a different character than that usually obtained by normal frequency modulation of the master oscillator or primary tone generator.

The invention is also concerned with an arrangement of the nature referred to in which output loads are substantially isolated from the basic oscillating arrangement in each stage thereof so that even shorted loads or highly capacitive loads that might interfere with the generation of the basic rectangular waves will be so isolated that the generator and the frequency dividers will continue to operate in a normal manner and will thus not become inoperative or dead.

The exact nature of the present invention will become more apparent upon reference to the following detailed description taken in connection with the accompanying drawings in which.

BRIEF SUMMARY OF THE INVENTION:

The arrangement of the present invention utilizes a primary tone generator or basic oscillator and frequency dividers in series therewith. The oscillator is a conventional twelve tone oscillator and each output terminal has a series of frequency dividers connected thereto.

The outputs from the frequency dividers are symmetrical rectangular waves, namely, square waves, and each frequency divider supplies a circuit arrangement in which the duty cycle of the respective square wave supplied thereto is modified so as to contain a spectrum of both even and odd harmonics.

Furthermore, the duty cycle of the output of each of the circuit arrangements is variable thereby to vary the harmonic content thereof and substantially to eliminate, when desired, certain harmonics therefrom.

Figures 1, 2, 4, 7, 8:
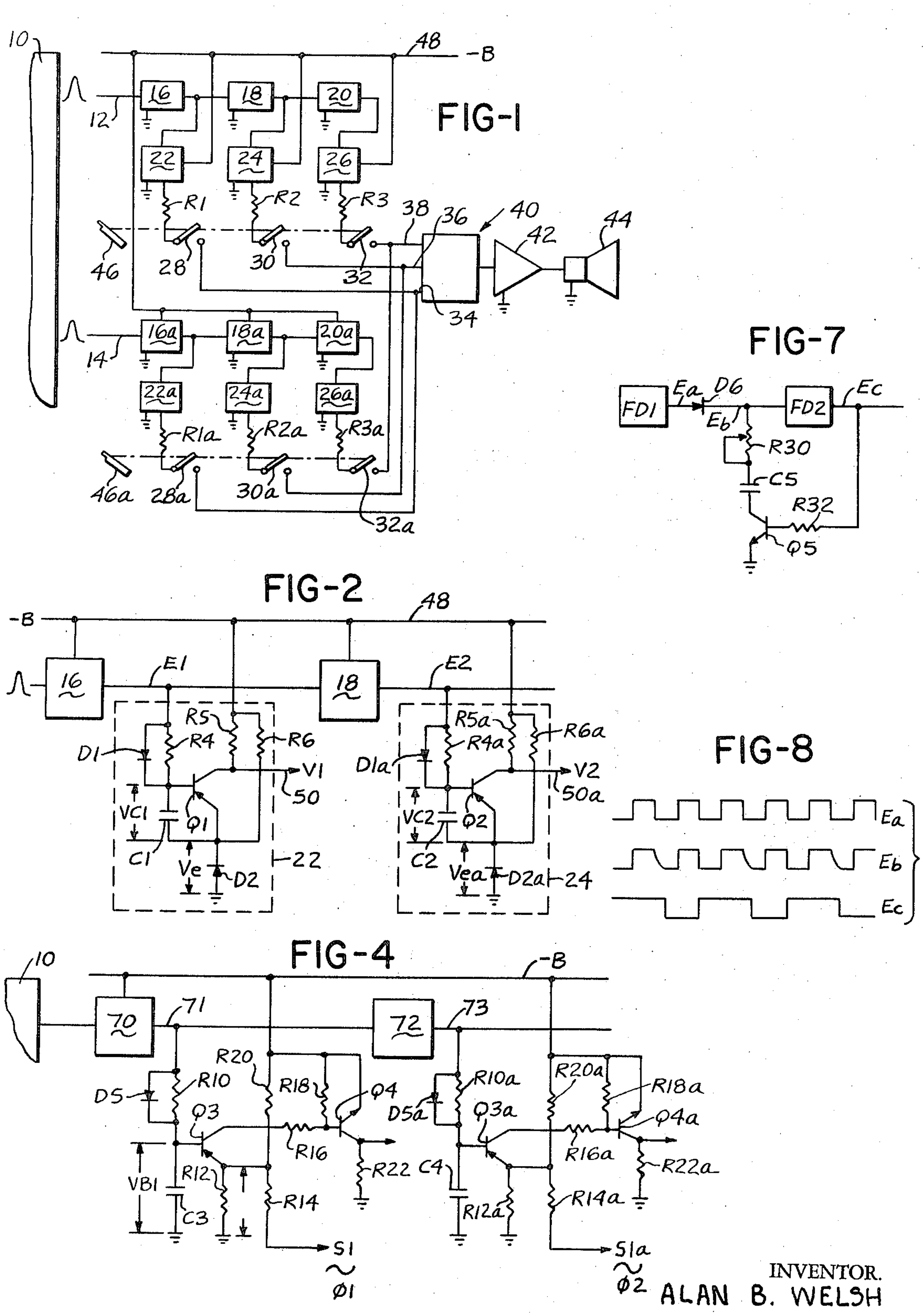
FIG. 1 is a schematic view of a portion of the circuit of an electronic organ in which the apparatus or circuit arrangement of the present invention is incorporated.
FIG. 2 is a fragmentary view showing two stages of the frequency divider following the primary tone generator and the circuit arrangement of the present invention in circuit therewith.
FIG. 4 is a view similar to FIG. 2, but showing a somewhat modified circuit arrangement.
FIG. 7 shows a modified circuit.
FIG. 8 is a graph showing the voltages in FIG. 7.

DETAILED DESCRIPTION OF THE INVENTION:

Referring to the drawings more in detail, in FIG. 1, a master oscillator, or primary tone generator, is fragmentarily illustrated at 10, and two output terminals 12 and 14 are illustrated, which might be supplying the tones for the notes C and C sharp, for example. The oscillator has twelve outputs but, for the sake of simplicity, only two are shown.

Output 12 is connected through the serially arranged frequency dividers 16, 18 and 20 and which are, in essence, bistable multivibrators so that the output from each thereof is one-half the frequency of the output of the next preceding one thereof. Only three frequency dividers are illustrated, but it will be understood that more thereof could be provided if desired.

The output sides of the respective frequency dividers are also connected to the input terminals of circuits 22, 24 and 26. The output side of each circuit is connected through a resistor R1, R2, R3 to one side of a key operated switch blade 28, 30, 32, the output sides of which are connected by bus wires 34, 36 and 38 with the input sides of voice formant filters and control tabs therefor which are of a conventional nature and which are, therefore, schematically illustrated by the rectangle 40. The output sides of the voice formant filters, when the tabs pertaining thereto are closed, lead to the input side of an amplifier system 42 which supplies a speaker system 44.

The input bus wires 34, 36 and 38 might correspond, for example, to footages of 4 feet, 8 feet, and 16 feet, respectively.

The switch blades 28, 30 and 32 are under the control of a single playing key 46 which might, as mentioned, be one of the C keys, such as middle C.

The output terminal 14 of master oscillator 10 is connected through a substantially identical circuit with wires 34, 36 and 38, and all of the elements of the circuit carries the same numbers as employed in the first described part of the circuit with the addition of the letter "a." The playing key **46*a* in the lower portion of the circuit might, for example, correspond to the key C sharp, one-half step higher than key 46**.

The circuitry contained in any of the boxes 22, 24, 26, **22*a*, 24*a* and 26*a* of FIG. 1 is shown more in detail in FIG. 2. FIG. 2 illustrates specifically circuits 22 and 24 which are exemplary of all of the circuits referred to. In FIG. 2, the output side of frequency divider 16** supplies a voltage E1, in the form of a square wave, and the output side of the frequency divider is connected via a resistor R4 with the base of a PNP transistor Q1 with a diode D1 connected in parallel with the resistor and poled toward the transistor base.

A capacitor C1 is connected between the base of the transistor and a point of lower potential, specifically, the emitter of the transistor and also through a diode D2 with a point of lower potential, in this case, ground potential, or +B voltage, and with diode D2 being poled toward the emitter of transistor Q1. The −B voltage supply at 48 is connected via resistor R5 with the collector of transistor Q1 and via resistor R6 with the emitter thereof. The output terminal of the circuit is represented by wire 50 at which a voltage V1, in the form of an asymmetric rectangular wave, is developed and which is connected to the end of resistor R1 opposite switch blade 28.

As marked in the circuit, in addition to the output voltage E1 from frequency divider 16 and output voltage V1 taken from the collector of transistor Q1, the voltage VC1 across capacitor C1 [and the voltage Ve across diode D2] are indicated in FIG. 2.

FIG. 2 also shows the corresponding circuit which is supplied by divider 18 and the same reference characters are employed with the addition of an "a" except for the transistor which is identified at Q2 and the capacitor which is identified at C2.

Figure 3:
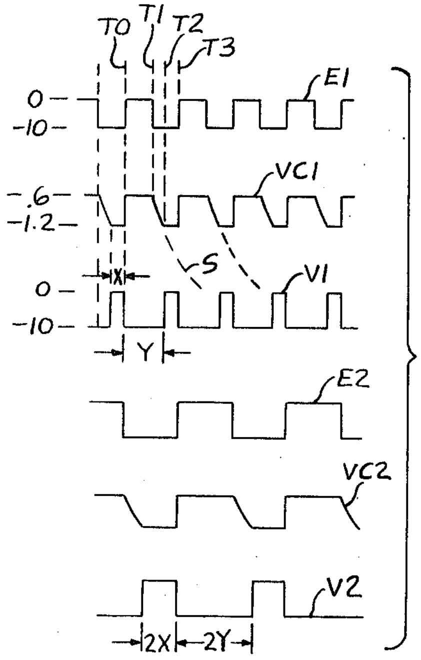
FIG. 3 is a view showing wave forms at various identified points in the circuit of FIG. 2.

Turning now to FIG. 3, the manner in which the system operates will be clear. At the top of FIG. 3, voltage E1 is depicted, and it will be seen to vary between zero and −10 volts and to be in the form of a symmetrical rectangular wave, namely, a square wave.

The voltage established across capacitor C1, and which is also the base-emitter voltage of transistor Q1, will be seen to take a form different from square wave E1 due to the presence of the resistor R4 and diode D1 in circuit with capacitor C1. Specifically, considering the time TO as shown on the portion of FIG. 3 illustrating VC1, when voltage wave E1 goes from −10 to zero, the voltage across VC1 changes simultaneously therewith from about −1.2 to about −.6 volts and remains at the −.6 volts level until E1 goes from zero toward −10 volts.

When E1 goes to −10 volts, diode D1 is back biased or nonconducting, and the time constant of the network made up of resistor R4 and capacitor C1, the voltage across the capacitor changes as shown by the inclined line S. This line extends from a time T1 to a time T2. The voltage across capacitor C1 remains at −1.2 volts until voltage E1 again goes toward zero.

As to the voltage V1, this changes with the change in conductance of transistor Q1. Transistor Q1 will commence to conduct at time T2 and will cease to conduct at time T3. Time T2 corresponds to the lower end of slope S and time T3 corresponds to the time that voltage E1 goes from −10 volts back to zero. The voltage wave developed at V1 is thus an asymmetric rectangular wave in which the portion X, of shorter duration, together with the portion Y, of longer duration, represents the same period of time taken up for one complete wave at E1.

The operation of the circuit, in brief, is as follows:

On the negative going edge of E1, diode D1 is reverse biased and capacitor C1 is charged through resistor R4. The time constant R4C1 determines the slope S referred to. When the voltage at VC1 reaches conduction, voltage for transistor Q1, the transistor switches on and the voltage at V1 changes.

At the positive going edge of E1, diode D1 is forward biased and since the impedance of the diode is low compared to that of resistor R4, the time constant represented by the impedance of the diode and capacitor C1 is extremely short. Thus, there is substantially no slope to the trailing edge of wave form VC1 and transistor Q1 switches off substantially simultaneously with the trailing edge of E1.

It will be evident that the time constant R4C1 determines the slope S of the delayed wave form at VC1.

The quiescence emitter voltage determines the point on VC1 which is the trip point for the transistor. Diode D2 in the circuit establishes a fixed bias of about −.6 volts to establish a certain quiescent emitter voltage. Diode D2 may be replaced by a resistor, or the emitter may be grounded, but the switching time of transistor Q1 is enhanced by using diode D2. At the instant that transistor Q1 commences to conduct, there is a small increase in voltage Ve across diode D2 and this is fed back to the base of the transistor via capacitor C1 to aid in driving the transistor to saturation and increase the switching speed at the collector of the transistor.

The harmonic content of the wave at V1 is totally different from that of the wave at E1, depending on the particular duty cycle of the wave at V1, and contains even harmonics as well as odd harmonics. The wave can thus be employed in the formation of voices having substantially different qualities than voices that would be derived from a square wave.

FIG. 3 also shows the output E2 from the second frequency divider 18 together with the voltage VC2 taken across capacitor C2 associated with transistor Q2 and the wave form V2 taken from the collector of transistor Q2 and which will be seen to be identical in shape to the wave form at V1 but at only one-half the frequency.

The parameters of the circuit following frequency divider 18 may be the same as those in the circuit following frequency divider 16 except for capacitor C2 which may be larger than capacitor C1 to increase the slope of the portion S of the voltage curve V2 so as to maintain the proper duty cycle thereof in conformity with the duty cycle of voltage V1.

The wave forms at V1 and V2 are thus identical, the waves differing only in frequency, but as will become apparent hereinafter, the duty cycles of different ones of the asymmetric output waves can be changed relative to others thereof to provide for certain special effects.

FIG. 4 shows a modified arrangement which is illustrated fragmentarily. In FIG. 4, tone generator 10 supplies frequency dividers 70 and 72 arranged in serial relation and each of which produces a respective square wave 71, 73 at the output side and with square wave 71 being twice the frequency of square wave 73.

The circuits following the outputs of the frequency dividers are substantially identical and only one will be described in detail with the reference numerals employed therein being duplicated in the other, with the addition of the letter "*a*" in most cases. In FIG. 4, the output side of frequency divider 70 is connected through a resistor R10 with the base of a transistor Q3 with a diode D5 connected in parallel with the resistor and poled toward the transistor base. The base of the transistor is also connected to ground via a capacitor C3.

The emitter of transistor Q3 is connected to ground via resistor R12 and is connected to a source S1 through a resistor R14. The source S1 is a source of varying voltage which might, for example, as will be explained hereinafter, vary cyclically at a predetermined rate between upper and lower limits or might even alternate about a zero point.

The collector of transistor Q3 is connected via a resistor R16 with the base of a transistor Q4 and the said base is also connected via a resistor R18 with the emitter of transistor Q4 and also with the B- supply. The B- supply is, furthermore, connected through a resistor R20 with the emitter of transistor Q3.

The output of the circuit is taken from the collector of transistor Q4 and the collector is also connected through resistor R22 with ground.

The circuit connected to the output side of frequency divider 72 is the same as that just described and the same reference numerals are employed with the addition of the letter "*a*," except the capacitor corresponding to capacitor C3, is identified at C4. Capacitor C4 is about twice the size of the capacitor C3 in the next preceding circuit.

The source S1*a* which is connected via resistor R14*a* with the emitter of transistor Q3*a* may be the same source as source S1, or it may have a certain phase relation thereto and be at the same frequency or it may vary in amplitude and/or frequency.

Figure 5:
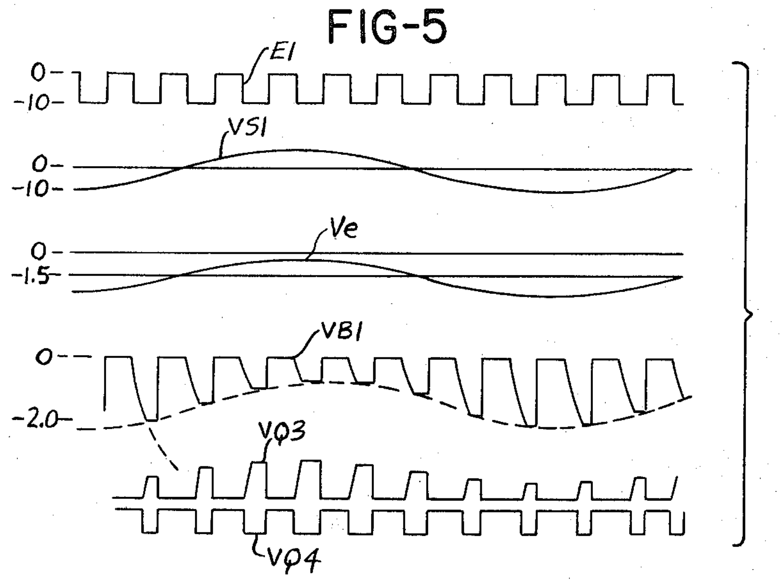
FIG. 5 is a view like FIG. 3, but showing voltages at designated points in the circuit of FIG. 4.

The voltages established in the circuit of FIG. 4, with respect to frequency divider 70 and the transistorized circuit connected to the output side thereof are identified in FIG. 5. In FIG. 5, the voltage identified at E1 will be seen to correspond to the output voltage wave identified at 71 in FIG. 4. This voltage wave varies from about zero to about −8 or −10 volts.

The voltage of the source S1 is indicated at VS1 in FIG. 5, and it will be seen to be an alternating current wave which may vary from about 410 volts to about −10 volts and at a relatively low frequency. The frequency of wave VS1 may be a vibrato frequency, which is about 7 cycles per second, or it may be somewhat higher or lower.

Due to the supply of the voltage wave from S1 through resistor R14 to the emitter terminal of transistor Q3, the voltage Ve standing across resistor R12 varies about as shown in FIG. 5, between about −1.5 volts up to nearly 0 volts and at, of course, the same frequency, as the voltage wave VS1.

It will at once be apparent that the base voltage of transistor Q3, indicated by VB1, will vary in a cyclic manner thereby changing the instant at which transistor Q3 conducts at each negative going side of the voltage wave 71. This, in turn, determines the characteristics of the voltage wave produced at tht collector side of transistor Q3 as indicated by the voltage line marked VQ3.

It will be perceived that the voltage pulses developed at the collector of transistor Q3 vary in both amplitude and duration in a cyclic manner corresponding to the cyclic variations in the voltage wave from source S1.

The output from the circuit, which is taken from the collector of transistor Q4, and is represented by the voltage line VQ4 in FIG. 5, thus varies in duty cycle, but is substantially constant with respect to amplitude.

The outputs from transistors Q4 and Q4*a* can be caused to vary in unison, if desired, but they can also be caused to vary in the same manner while bearing a certain phase relation to each other, or each output can be made to vary in its own individual manner or to produce an output wave having a fixed duty cycle of some selected value by applying a DC bias voltage to all, or some, of points S1 in FIG. 4. Special musical effects can be obtained in this manner, notably, a particularly live vibrato or a celeste effect.

A multiphase source can be used to supply sources S1 and S1a so that there will not be any instantaneous identical duty cycle of successive tones or octaves. The result is to produce an effect of an "unlocked" generator which sounds like the tones of the two notes on an octave are slightly detuned. Detuning is not actually present in the circuit of the present invention, but because the higher order harmonics are rising and falling, a celeste or unlocked tone effect is had.

Figure 6:
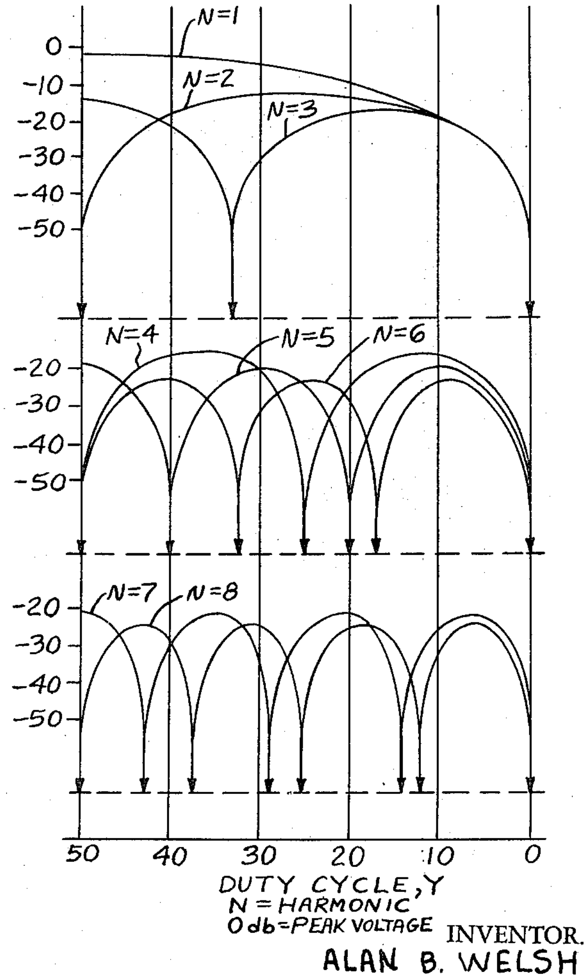
FIG. 6 is a graph showing the manner in which the harmonic content on a rectangular wave varies as the duty cycle thereof changes from about 50:50 to about 1:99.

The harmonic content of rectangular waves having duty cycle ratios ranging from 50:50 to 1:99 are shown in FIG. 6. In this figure, the fundamental and harmonics 2 through 8 are illustrated and the strength of the fundamental and the various harmonics in decibels is plotted against the duty cycle of the respective rectangular wave. The duty cycle, which is the abscissa, is graduated in the percentage of the total wave made up by the portion of shorter duration. Thus, at the extreme left, at the ordinate marked 50, the wave is square and progressing rightwardly relative to the chart with shorter portion of the wave progressively shortens and the longer portion progressively lengthens with the two portions adding up to 100 percent of the duration of a wave. The ordinate at zero represents steady state current.

It is believed that it will be readily evident in FIG. 6 that the harmonic content of the rectangular wave changes radically as the duty cycle changes. The fundamental does not change appreciably, nor does the second harmonic change appreciably between about 45 per cent duty cycle to about 5 per cent, but all of the other harmonics have definite regions of maximum and minimum values.

It will be readily apparent in FIG. 6 that substantially any desired harmonic content can be imparted to the rectangular wave merely by adjusting the duty cycle thereof, including the diminishing of unwanted harmonics as well as the reinforcing of wanted harmonics.

As opposed to systems of the prior art which utilize resistive mixing and filters and the like, the arrangement of the present invention represents a complete harmonic generating system which can readily be adjusted to produce desired musical effects, including transient effects, special voices and the like.

FIG. 7 shows a modified circuit in which a source of two level signals is provided such as a frequency divider FD1 which produces an output voltage E*a* and is connected through a diode D6 to the input side of a second frequency divider FD2. The voltage at the output side of diode D6 is marked Eb and the voltage at the output side of frequency divider FD2 is marked E*c*.

The input side of frequency divider FD2 is connected via a resistor R30 and a capacitor C5 with the collector of a transistor Q5, the emitter of which is grounded and the base of which is connected via a resistor R32 with the output side of divider FD2. Resistor R30 may, if desired, be adjustable as shown.

FIG. 8 shows the voltages that obtain in the circuit of FIG. 7. It will be seen that E*a* changes between two levels at a uniform rate, whereas E*b*, at the output side of diode D6, changes in a delayed manner in one direction, namely, when voltage E*c* is of such polarity as to make Q5 conductive. When Q5 is conductive, FD2 operates as a detector and changes state at a certain point on the gradually declining trailing side of E*b* when Q5 is conductive.

In this manner, an input pulse having uniform duty cycle can produce an output pulse having a nonuniform duty cycle, and it can be made variable by adjusting one or the other of the parameters in the circuit pertaining to C5.

It has been explained in detail how the pulse having the nonuniform duty cycle is of merit in the generation of musical tones, but it is also the case that a signal varying between two levels and having a nonuniform duty cycle is of merit in telemetry and the like. The information contained in a two level signal can be indicated by the duty cycle of the signal and, in this manner, forms an important tool for use in telemetry.

For example, in the circuit of FIG. 7, as well as other circuits indicated, when the parameters of the circuit, such as resistor R30 in FIG. 7, could be varied in response to a stimulous to be measured and the change in the duty cycle of the output signal would thus form the means for measuring the stimulous at a remote location.

Other applications of the two level output signal having a variation or adjustable duty cycle will occur to those skilled in the art.

In the appended claims, the transistor of which the collector forms the output terminal at which asymmetrical rectangular waves are developed is referred to as the "output transistor" whereas the transistor having the base connected to the source of square waves is referred to as the "input transistor."

Modifications may be made within the scope of the appended claims.

What is claimed is:

1. In combination; generator means having at least one output forming a source of square waves and a circuit connected to the output for converting the square waves into asymmetrical rectangular waves, said circuit comprising; an output transistor having base, collector and emitter terminals, a source of biasing voltage and a first resistor connected in series with said collector and emitter terminals, a first point spaced from the voltage source end of said first resistor forming an output terminal for the rectangular waves, an input transistor also having base, collector and emitter terminals, said source of biasing voltage and a second resistor connected in series with the collector and emitter terminals of said input transistor, a second point spaced from the voltage source end of said second resistor being connected to the base terminal of said output transistor, a third resistor connecting said generator means output to the base terminal of said input transistor, a diode in parallel with said third resistor, a capacitor connected between the base and emitter terminals of said input transistor, a source of control voltage, and a fourth resistor connected to said source of control voltage and operatively connected to at least one of the base and emitter terminals of said input transistor whereby variations in said control voltage will cause variations in the voltage supplied to the base terminal of said output transistor.

2. A combination according to claim 1 in which said control voltage is variable.

3. A combination according to claim 1 in which said control voltage varies cyclically.

4. A combination according to claim 1 in which said fourth resistor is in the base-emitter circuit of said input transistor.

5. A combination according to claim 1 in which said output transistor is an NPN transistor having the collector terminal forming the output terminal means and connected to ground via said first resistor and having the emitter terminal connected to the negative side of said source of biasing voltage, said second resistor connecting said base terminal to the negative side of said source, said input transistor being a PNP transistor having the emitter terminal connected to ground via said fourth resistor and to said negative side of said source via a further resistor and the collector terminal being connected to the base terminal of said output transistor, said capacitor being connected between the base terminal of said input transistor and ground, and said diode in parallel with said third resistor being poled toward the base terminal of said input transistor, said square waves being negative going square waves.

6. The combination according to claim 1 in which said generator means comprises a square wave generator and a series of frequency dividers connected in cascade, and a said circuit for converting square waves into asymmetrical rectangular waves connected to the output side of each said frequency divider.

7. The combination according to claim 6 in which said source of control voltage is common to at least some of said circuits.

8. The combination according to claim 6 which includes a respective source of control voltage for at least some of said circuits.

9. The combination according to claim 6 in which each said output transistor is an NPN transistor and each said input transistor is a PNP transistor.

* * * * *